Jan. 31, 1928.
H. E. YARROW
WATER TUBE BOILER
Filed May 15, 1925
1,657,951
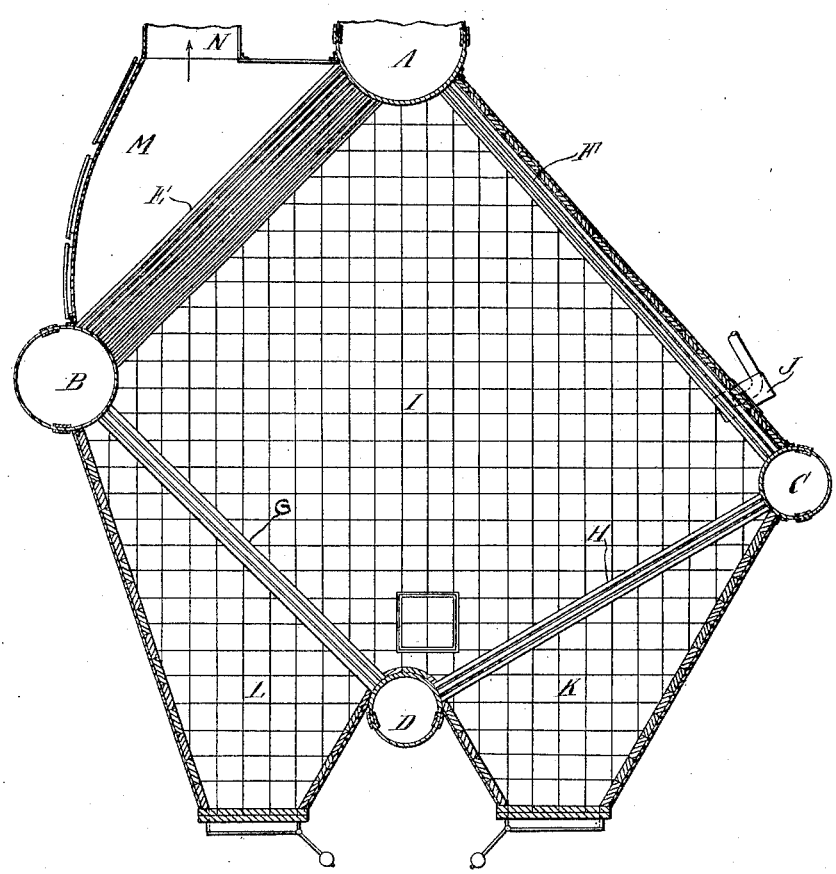
Inventor
Harold Edgar Yarrow
By
James L. Norris
Attorney.

Patented Jan. 31, 1928.

1,657,951

UNITED STATES PATENT OFFICE.

HAROLD EDGAR YARROW, OF GLASGOW, SCOTLAND.

WATER-TUBE BOILER.

Application filed May 15, 1925, Serial No. 30,597, and in Great Britain November 7, 1924.

This invention relates to water tube boilers fired by pulverized fuel. In such boilers a large combustion space is required for the combustion of the fuel and further, to keep the temperature of this combustion space sufficiently low to prevent rapid deterioration of the brickwork of the furnace, it is necessary to have a large heat-absorbing surface exposed to the radiation from the incandescent flame. Further, it is also necessary or desirable that the incombustible portions of the powdered fuel should be reduced in temperature before it collects in the ashpit, as otherwise it is liable to form large lumps which are difficult to remove.

These conditions are secured according to the present invention by the specific arrangement of steam and water drums and their connecting tubes hereinafter described. In this arrangement there is a single elevated steam drum and a pair of water drums at a lower level or lower levels, one on each side of the combustion chamber and connected with the steam drum by banks of water tubes. In addition there is another water drum at a still lower level substantially in the same vertical plane as the steam drum and connected by a bank or banks of tubes with both of the other two water drums. The combustion space is thus bounded upon all four sides by banks of water tubes which provide the necessary large heat-absorbing and radiating surface without materially restricting the combustion space which is very large compared with the total space occupied by the boiler.

One embodiment of the invention is illustrated in the accompanying drawing which shows a cross section of a Yarrow boiler adapted for burning pulverized fuel.

In the drawing A is the elevated steam drum and B and C two water drums, one at either side of the furnace and either at the same level or, as shown, with one of the water drums, namely C, at a somewhat lower level than the other. In addition there is a central water drum D at a still lower level and substantially vertically below the steam drum A. The water drum B which is upon that side of the furnace leading to the uptake for the furnace gases is preferably of greater diameter than either of the others and is connected with the steam drum A by a bank of water tubes E of considerable depth, the water drum C upon that side of the furnace which is closed to the passage of furnace gases being of smaller diameter and connected with the steam drum A by a bank of tubes F of less depth.

The bottom water drum D may be connected, as shown, with the water drums B and C by comparatively shallow banks of water tubes G and H respectively, or it may be connected with only one of the other water drums, for example water drum C, by water tubes.

The banks of tubes F, G and H need only be of comparatively small depth, for example three or four rows, as they are substantially subject to heating only by radiation from the combustion chamber and are not swept by the furnace gases on their passage to the uptake as in the case of the tubes E. In this arrangement a large combustion chamber I enclosed by water tubes is provided for the combustion of the pulverized fuel injected by fuel burners such as J into the furnace, spaces being left in the bank F of water tubes for the accommodation of these burners.

The lower banks of tubes G, H, besides constituting additional heat-absorbing and radiating surfaces, serve also to reduce the temperature of the incombustible elements of the fuel as it drops in a powdered form towards the ashpits K and L, and this incombustible material being thus cooled while in a finely divided state is thereby prevented from becoming consolidated and forming a fused mass in the ashpits from which it can therefore be easily removed in the form of dust.

The furnace gases, after traversing the main bank of water tubes E, pass to a smokebox M and thence through an uptake N to the chimney direct or after first passing through an economizer superheater or air heater, or any two or more of these devices.

By arranging the water drum C at a lower level than the water drum B and disposing the fuel burners J in one or more rows immediately above the water drum C, the burning fuel assumes a curved path through the burners J to the uptake which, throughout a large portion of its length, is substantially parallel with the tubes H and G, so that as the ash separates from the flame it falls through these banks of tubes into the ash spaces L, K into which the burning gases do not pass and which, being thus screened from the furnace, have a relatively low temperature.

As in other known constructions of Yarrow boilers, the water drum B and bank of tubes E may be replaced by two water drums each connected by a bank of tubes with the steam drum A and a superheater intercalated between these two banks of tubes.

The circulation of water in all the banks of tubes is in accordance with the well known Yarrow system and it is not necessary to provide any special means for circulating the water in the two lower banks of tubes, because there will be a circulation initiated in these tubes between the lowest drum and one or both of the side water drums.

Having thus described the nature of the said invention and the best means I know of carrying the same into practical effect, I claim:—

1. A water tube boiler for burning pulverized fuel comprising four banks of water tubes arranged in lozenge or diamond form in a closed series of two upper and two lower banks, fuel jets directing streams of combustible transversely through one of the said upper banks of tubes in a direction substantially parallel with the tubes of an adjacent lower bank, and a single uptake for the combustion products, said uptake being disposed on the side of the boiler opposite to the said fuel jets.

2. A water tube boiler for burning pulverized fuel comprising an elevated steam drum, two water drums parallel therewith but at a substantially lower level, one on either side of the furnace, a third water drum at a still lower level of the furnace and located substantially directly below the steam drum, four banks of water tubes connecting the water drums in a closed series, fuel jets directing streams of combustible transversely through one of the upper banks of water tubes into the space enclosed by the said four banks of tubes, and an uptake for the waste gases located beyond the other of the upper banks of water tubes.

3. A water tube boiler according to claim 2, wherein one of the two first-mentioned water drums is at a lower water level than the water drum on the opposite side of the furnace and the pulverized fuel burners are disposed immediately above the former water drum, substantially as described.

In testimony whereof I have signed my name to this specification.

HAROLD E. YARROW.